US011338385B2

(12) United States Patent
Matsuyama et al.

(10) Patent No.: US 11,338,385 B2
(45) Date of Patent: May 24, 2022

(54) MACHINE COMPONENT AND METHOD FOR PRODUCING THE SAME

(71) Applicant: KOMATSU LTD., Tokyo (JP)

(72) Inventors: Toshikazu Matsuyama, Hirakata (JP); Masaharu Amano, Hirakata (JP); Yoshitaka Shibata, Hirakata (JP)

(73) Assignee: KOMATSU LTD., Tokyo (JP)

( * ) Notice: Subject to any disclaimer, the term of this patent is extended or adjusted under 35 U.S.C. 154(b) by 772 days.

(21) Appl. No.: 15/756,002

(22) PCT Filed: Oct. 29, 2015

(86) PCT No.: PCT/JP2015/080586
§ 371 (c)(1),
(2) Date: Feb. 27, 2018

(87) PCT Pub. No.: WO2017/072918
PCT Pub. Date: May 4, 2017

(65) Prior Publication Data
US 2018/0339361 A1 Nov. 29, 2018

(51) Int. Cl.
*B23K 20/00* (2006.01)
*B23K 20/12* (2006.01)
(Continued)

(52) U.S. Cl.
CPC ............ *B23K 20/12* (2013.01); *B23K 20/129* (2013.01); *B23K 20/227* (2013.01); *B23K 20/24* (2013.01);
(Continued)

(58) Field of Classification Search
CPC .. B23K 20/12; B23K 20/1225; B23K 20/124; B23K 20/1255; B23K 20/126;
(Continued)

(56) References Cited

U.S. PATENT DOCUMENTS 3,114,405 A * 12/1963 Tait ..................... F16B 5/0208
411/349
3,924,508 A * 12/1975 DeCaro .................. B23K 20/22
470/11
(Continued)

FOREIGN PATENT DOCUMENTS

| CN | 1223190 A | 7/1999 |
| JP | S56-50581 U | 5/1981 |

(Continued)

OTHER PUBLICATIONS https://amesweb.info/Materials/Linear-Thermal-Expansion-Coefficient-Metals.aspx, Linear Thermal Expansion Coefficient (Year: 2020).*
(Continued)

*Primary Examiner* — Erin B Saad
(74) *Attorney, Agent, or Firm* — Oliff PLC

(57) ABSTRACT

A machine component includes a first region having a first linear expansion coefficient, and a second region having a second linear expansion coefficient greater than the first linear expansion coefficient and joined to the first region. A region including an outer periphery of an interface between the first region and the second region is inclined toward the second region side over the entire periphery. On a surface of the first region, a groove is formed to extend along the outer periphery of the interface.

20 Claims, 11 Drawing Sheets

(51) Int. Cl.
*B23K 33/00* (2006.01)
*B23K 20/227* (2006.01)
*B23K 20/24* (2006.01)
*B23K 103/22* (2006.01)
*C21D 9/50* (2006.01)

(52) U.S. Cl.
CPC ........ *B23K 33/006* (2013.01); *B23K 2103/22* (2018.08); *C21D 9/50* (2013.01)

(58) Field of Classification Search
CPC .............. B23K 20/129; B23K 2103/10; B23K 20/122; B23K 20/123; B23K 20/1245; B23K 20/125; B23K 20/1265; B23K 20/22; B23K 2101/14; B23K 2101/18; B23K 2101/28; B23K 2101/40; B23K 2103/04; B23K 2103/12; B23K 2103/14; B23K 33/006
See application file for complete search history.

(56) References Cited

U.S. PATENT DOCUMENTS

| | | | | |
|---|---|---|---|---|
| 4,816,346 A * | 3/1989 | Hulsey | ................... | B21H 3/027 428/582 |
| 6,293,744 B1 * | 9/2001 | Hempfling | ............ | F16B 33/004 411/372.5 |
| 10,835,788 B1 * | 11/2020 | Rice | ........................ | A63B 60/02 |
| 2002/0061417 A1 | 5/2002 | Shindo et al. | | |
| 2003/0031889 A1 | 2/2003 | Shindo et al. | | |
| 2005/0124432 A1 * | 6/2005 | Huang | .................. | A63B 53/047 473/305 |
| 2009/0118037 A1 * | 5/2009 | Roach | .................. | A63B 53/047 473/349 |
| 2010/0056298 A1 * | 3/2010 | Jertson | ............... | A63B 53/0466 473/345 |
| 2010/0130306 A1 * | 5/2010 | Schweigert | .......... | A63B 53/047 473/350 |
| 2011/0212795 A1 * | 9/2011 | Jertson | ............... | A63B 53/0466 473/345 |
| 2012/0289361 A1 * | 11/2012 | Beach | .................... | A63B 60/52 473/338 |
| 2013/0210542 A1 * | 8/2013 | Harbert | .................. | A63B 53/06 473/338 |
| 2015/0016920 A1 * | 1/2015 | Yamazaki | ............. | F16B 39/284 411/366.1 |
| 2017/0203383 A1 * | 7/2017 | Shibata | ................... | F04B 1/124 |

FOREIGN PATENT DOCUMENTS

| | | |
|---|---|---|
| JP | H06-63775 A | 3/1994 |
| JP | H08-245276 A | 9/1996 |
| JP | H08-281453 A | 10/1996 |
| JP | H08-290265 A | 11/1996 |
| JP | H11-300483 A | 11/1999 |
| JP | 2005-169490 A | 6/2005 |
| JP | 2008-012573 A | 1/2008 |
| TW | 2005-18865 A | 6/2005 |
| WO | WO-2013094672 A1 * | 6/2013 ............ F16B 5/0241 |

OTHER PUBLICATIONS https://amesweb.info/Materials/Linear_Thermal_Expansion_Coefficient_of_Steel.aspx, AmesWeb (Year: 2021).*
https://amesweb.info/Materials/Linear_Thermal_Expansion_Coefficient_of_Steel.aspx, Atlantic Fasteners, Nov. 21, 2014 (Year: 2014).*
https://amesweb.info/Materials/Linear-Thermal-Expansion-Coefficient-Metals.aspx (Year: 2021).*
Jan. 19, 2016 International Search Report issued in International Patent Application No. PCT/JP2015/080586.

* cited by examiner

MACHINE COMPONENT AND METHOD FOR PRODUCING THE SAME

TECHNICAL FIELD

The present invention relates to machine components and methods for producing the machine components.

BACKGROUND ART

A component may be produced with members having different linear expansion coefficients joined together. Such a component may suffer cracking in a joint portion, due to thermal stress generated in the joint portion with temperature changes. For joining members, a brazing material can be used. A technique, when using a brazing material to join members different in linear expansion coefficient, to form a plurality of recesses on a joint surface of the member greater in linear expansion coefficient has been proposed (see, for example, Japanese Patent Application Laid-Open No. H08-290265 (Patent Literature 1)). This can relax the thermal stress in the joint portion.

CITATION LIST

Patent Literature

Patent Literature 1: Japanese Patent Application Laid-Open No. H08-290265

SUMMARY OF INVENTION

Technical Problem

The technique described in Patent Literature 1 above requires the use of a brazing material that takes a liquid phase when joining. Using a brazing material, however, may lead to problems such as insufficient strength of the joint surface because of the strength of the brazing material.

An object of the present invention is, in a machine component having members different in linear expansion coefficient joined without the use of a brazing material, to prevent cracking due to thermal stress generated in the joint surface.

Solution to Problem

A machine component according to the present invention includes: a first region having a first linear expansion coefficient; and a second region having a second linear expansion coefficient greater than the first linear expansion coefficient and joined to the first region. A region including an outer periphery of an interface between the first region and the second region is inclined toward the second region side over the entire periphery. The first region has a surface with a groove formed thereon, the groove extending along the outer periphery of the interface.

In the case where regions having different linear expansion coefficients are joined together, thermal stress will focus on and around the outer periphery of their interface during temperature changes. This may cause problems such as cracking in the vicinity of the outer periphery of the interface.

In the machine component of the present invention, the region including the outer periphery of the interface between the first region and the second region having different linear expansion coefficients is inclined, over the entire periphery, toward the second region side which is the side relatively greater in linear expansion coefficient. With this, thermal stress is distributed over a wider range toward the region on the inner peripheral side of the interface and toward the outer peripheral surface on the first region side.

In the machine component of the present invention, the groove extending along the outer periphery of the interface is formed on the surface of the first region which is the side relatively smaller in linear expansion coefficient. This makes it easier, during temperature changes, for the first region to follow the deformation of the second region which is the side relatively greater in linear expansion coefficient, leading to reduction in thermal stress generated in the vicinity of the interface.

In the machine component of the present invention, the thermal stress is distributed and also reduced as described above. As a result, according to the machine component of the present invention, it is possible to prevent cracking due to the thermal stress generated in the joint surface.

In the machine component described above, the groove may be formed continuously over the entire periphery along the outer periphery of the interface. This further reduces the thermal stress generated in the vicinity of the interface.

In the machine component described above, the interface may include an annular inclined portion, the annular inclined portion including the outer periphery of the interface and being inclined toward the second region side. The region including the outer periphery of the interface may be inclined toward the second region side over the entire periphery, with the formation of the annular inclined portion which includes the outer periphery of the interface and is inclined toward the second region side.

The inclined portion of the annular shape leaves, as a region (central portion) of the interface surrounded by the inclined portion, a non-inclined region, for example a flat region. This facilitates joining between the first region and the second region.

In the machine component described above, the first region and the second region may be of an axisymmetric shape and arranged coaxially. A width of the inclined portion in a direction perpendicular to the axial direction of the first and second regions may be at least $1/20$ and not greater than $1/10$ of a radius of a circle circumscribing the outer periphery of the interface.

When the width of the inclined portion is less than $1/20$ of the radius of the circle, the effect of distributing the thermal stress may be insufficient. Even when the width of the inclined portion is increased to exceed $1/10$ of the radius of the circle, the effect of distributing the thermal stress will not increase considerably. Therefore, the width of the inclined portion can be set to be at least $1/20$ and not greater than $1/10$ of the radius of the circle.

A machine component producing method according to the present invention includes: preparing a first member having a first linear expansion coefficient and a second member having a second linear expansion coefficient greater than the first linear expansion coefficient; joining the first member and the second member; and forming on a surface of the first member a groove extending along an outer periphery of an interface between the first member and the second member formed with the first member and the second member joined together. The joining of the first member and the second member includes heating the first member and the second member by relatively rotating the first member and the second member with respect to each other about an axis of rotation, while pressing the first member and the second member against each other, without changing a relative positional relationship between the first member and the second member, and cooling the first member and the second member heated, with the members being pressed against each other. In the joining of the first member and the second member, the interface between the first member and the second member is formed, in the heating of the first member and the second member, such that a region including an outer periphery of the interface is inclined toward the second member side over the entire periphery by deformation of a less deformation resistant member which is one of the first member and the second member smaller in deformation resistance than the other.

In the machine component producing method of the present invention, the first member and the second member are joined together, with the interface between the first and second members being formed such that the region including the outer periphery is inclined toward the second member side over the entire periphery. Thereafter, a groove is formed on the surface of the first member to extend along the outer periphery of the interface between the first and second members. According to the machine component producing method of the present invention, the machine component of the present invention capable of preventing cracking due to the thermal stress generated in the joint surface can be produced.

The machine component producing method described above may further include subjecting the first member and the second member to heat treatment after the formation of the groove on the first member. Even with the temperature changes according to the heat treatment, it is possible to prevent cracking due to the thermal stress generated in the joint surface.

In the machine component producing method described above, in the heating of the first member and the second member, the less deformation resistant member may be disposed in a cavity of a mold.

With this configuration, the less deformation resistant member is deformed in the cavity of the mold to thereby contact the wall surfaces defining the cavity. This prevents rotation of the less deformation resistant member together with the more deformation resistant member, and also prevents further deformation. Thus, the heat generated by the friction between the first member and the second member is prevented from being released from within the cavity. As a result, the heating of the first member and the second member can be performed efficiently.

In the machine component producing method described above, the mold may include a cavity bottom wall defining the cavity, and a cavity sidewall defining the cavity and extending in a direction intersecting the cavity bottom wall. This facilitates carrying out the machine component producing method described above.

In the machine component producing method described above, in the heating of the first member and the second member, a second contact surface, being a surface of the second member coming into contact with the first member, may be surrounded by the cavity sidewall. With this configuration, the deformation of the less deformation resistant member can be limited by the cavity sidewall.

In the machine component producing method described above, in the heating of the first member and the second member, the mold may be fixed, while the more deformation resistant member may be rotated. This facilitates carrying out the machine component producing method described above.

In the machine component producing method described above, a more deformation resistant member which is one of the first member and the second member greater in deformation resistance than the other may have a recess formed therein. In the heating of the first member and the second member, the less deformation resistant member in a state of being at least partially received in the recess may be relatively rotated with respect to the more deformation resistant member, while being relatively pressed against the more deformation resistant member, for heating the first member and the second member.

With this configuration, the less deformation resistant member is deformed in the recess of the more deformation resistant member to thereby contact the wall surfaces defining the recess. The deformation of the less deformation resistant member is limited by the wall surfaces defining the recess of the more deformation resistant member. Thus, the heat generated by the friction between the first member and the second member is prevented from being released from within the recess. As a result, the heating of the first member and the second member can be performed efficiently.

In the machine component producing method described above, the more deformation resistant member may include a recess bottom wall defining the recess, and a recess sidewall defining the recess and extending in a direction intersecting the recess bottom wall. In the heating of the first member and the second member, the less deformation resistant member may be relatively rotated while being relatively pressed against the recess bottom wall of the more deformation resistant member. This facilitates carrying out the machine component producing method described above.

In the machine component producing method described above, in the heating of the first member and the second member, the less deformation resistant member may be deformed to contact the recess sidewall. The recess sidewall limits the deformation of the less deformation resistant member, thereby facilitating carrying out the machine component producing method described above.

The machine component producing method described above may further include, in a state where the first member and the second member are joined together, machining the more deformation resistant member to remove the recess sidewall. With this configuration, it is possible to obtain a machine component formed with the more deformation resistant member joined to the less deformation resistant member at the recess bottom wall.

In the machine component producing method described above, in the heating of the first member and the second member, the more deformation resistant member may be fixed, while the less deformation resistant member may be rotated. This facilitates carrying out the machine component producing method described above.

The machine component producing method described above may further include, in a state where the first member and the second member are joined together, removing flash formed with the less deformation resistant member deformed in the heating of the first member and the second member. With this configuration, it is possible to obtain a machine component from which the flash formed when joining the first member and the second member has been removed.

In the machine component producing method described above, in the heating of the first member and the second member, the less deformation resistant member in the temperature increased state may have a deformation resistance at least 10% smaller than that of the more deformation resistant member in the temperature increased state. This facilitates joining the first member and the second member.

Effects of the Invention

As is clear from the above description, according to the machine component and its producing method in the present invention, it is possible to prevent cracking due to thermal stress generated in a joint surface in the machine component having members with different linear expansion coefficients joined together without the use of a brazing material.

DESCRIPTION OF EMBODIMENTS

Figure 1:
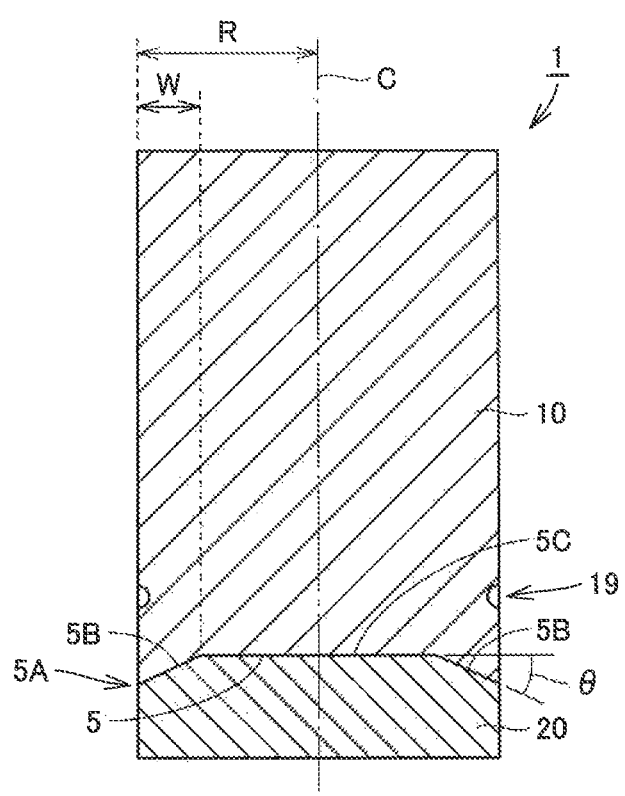
FIG. 1 is a schematic cross-sectional view showing the structure of a machine component according to a first embodiment.

Embodiments of the present invention will be described below. In the following drawings, the same or corresponding parts are denoted by the same reference numerals, and the description thereof will not be repeated.

First Embodiment

FIG. 1 is a schematic cross-sectional view showing the structure of a machine component in the present embodiment. Referring to FIG. 1, the machine component 1 has a structure having a first region 10 made of a first metal and a second region 20 made of a second metal joined together.

The first region 10 has a cylindrical shape. The second region 20 has a cylindrical (disk) shape. The first region 10 and the second region 20 are joined at an interface 5 which is a joint surface. The first region 10 has a first linear expansion coefficient. The second region 20 has a second linear expansion coefficient greater than the first linear expansion coefficient.

The second region 20 is smaller in deformation resistance than the first region 10. In the present embodiment, for the first metal forming the first region 10, steel (for example, alloy steel for machine structural use, such as JIS SCM440, or carbon steel for machine structural use) that has undergone thermal refining (quenching and tempering), for example, is adopted. For the second metal forming the second region 20, copper alloy (for example, high-strength brass) is adopted.

As described above, the first region 10 and the second region 20 have the cylindrical shape which is axisymmetric. The first region 10 and the second region 20 have central axes that agree with a central axis C of the machine component. The first region 10 and the second region 20 are arranged coaxially. The first region 10 has a diameter identical to that of the second region 20.

The interface 5 includes a central portion 5C which is a flat surface perpendicular to the central axis C, and an inclined portion 5B which is a surface inclined toward the second region 20 side with respect to a plane perpendicular to the central axis C. The interface 5 includes the inclined portion 5B of an annular shape, which portion includes an outer periphery 5A of the interface 5 and is inclined toward the second region 10 side. The central portion 5C is a circular flat surface. The inclined portion 5B is a right circular conical surface the central axis of which agrees with the central axis C. With the presence of the inclined portion 5B, the region including the outer periphery 5A of the interface 5 is inclined toward the second region 10 side over the entire periphery.

One end of the second region 20 on the first region 10 side has a convex shape that protrudes toward the first region 10. One end of the first region 10 on the second region 20 side has a concave shape corresponding to the end of the second region 20 of the convex shape. A width W of the inclined portion 5B in a direction perpendicular to the central axis C is at least 1/20 and not greater than 1/10 of a radius R of a circle circumscribing the outer periphery 5A of the interface 5 (radius R of the first region 10). An angle θ that the inclined portion 5B makes with a plane perpendicular to the central axis C can be at least 5° and not greater than 15°, for example.

The first region 10 has a surface (outer peripheral surface) on which a groove 19 is formed to extend along the outer periphery 5A of the interface 5. The groove 19 is formed continuously over the entire periphery along the outer periphery 5A of the interface 5. The groove 19 extends in parallel with the outer periphery 5A of the interface 5.

The wall surface that defines the groove 19 is a curved surface. In the cross section including the central axis C, the wall surface defining the groove 19 has an arc shape. In the cross section including the central axis C, the wall surface defining the groove 19 has a semicircular shape, for example. A radius of the inner wall may be at least 0.5 mm and not greater than 1.5 mm, for example, or it may be at least 0.8 mm and not greater than 1.2 mm. A distance of the groove 19 from the outer periphery 5A of the interface 5 may be at least 0.2 mm and not greater than 1.2 mm, for example, or it may be at least 0.2 mm and not greater than 0.8 mm, or further may be at least 0.2 mm and not greater than 0.5 mm. The shape of the groove 19 and the position where the groove 19 is to be formed can be determined through analysis of thermal stress in the vicinity of the outer periphery 5A of the interface 5 or in the vicinity of the bottom of the groove 19, for example.

The machine component 1 as described above can be produced by a machine component producing method in the present embodiment as follows.

Figure 2:
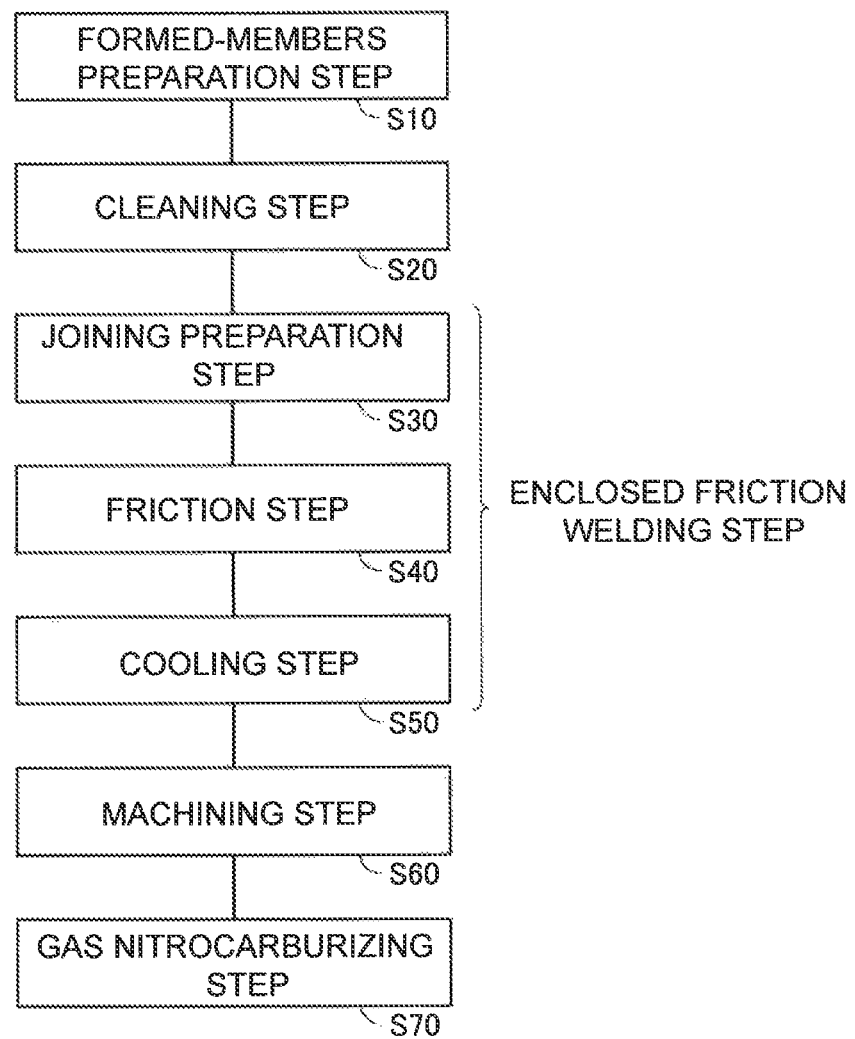
FIG. 2 is a flowchart schematically illustrating a method for producing a machine component.
Figure 3:
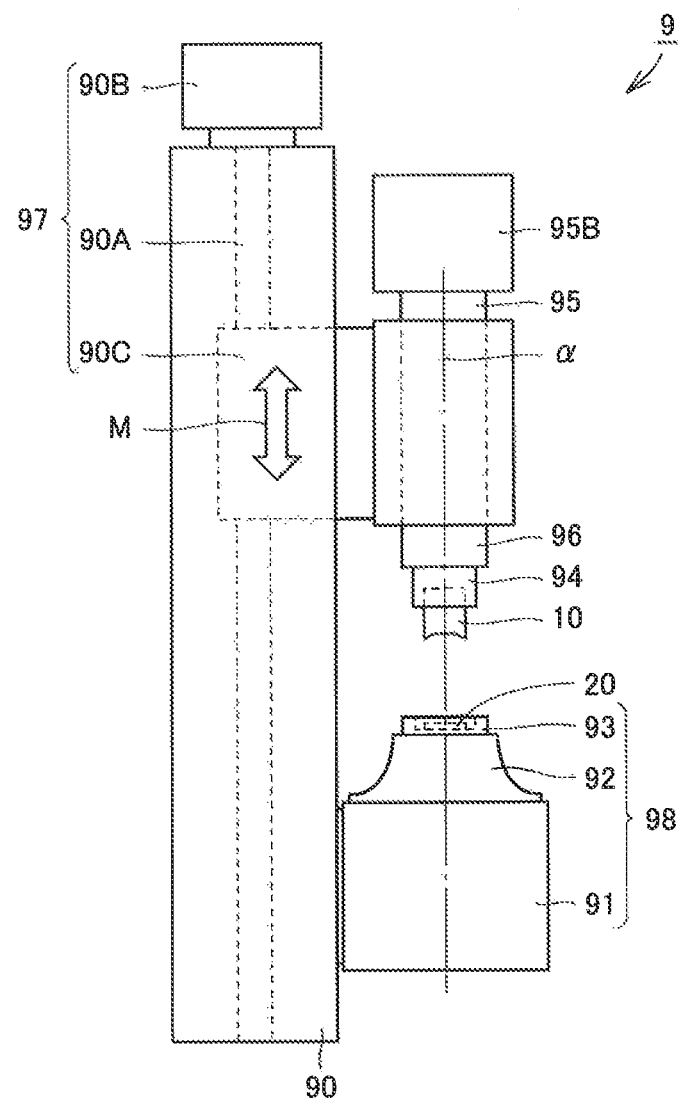
FIG. 3 is a schematic diagram showing the structure of a device for producing a machine component in the first embodiment.
Figure 4:
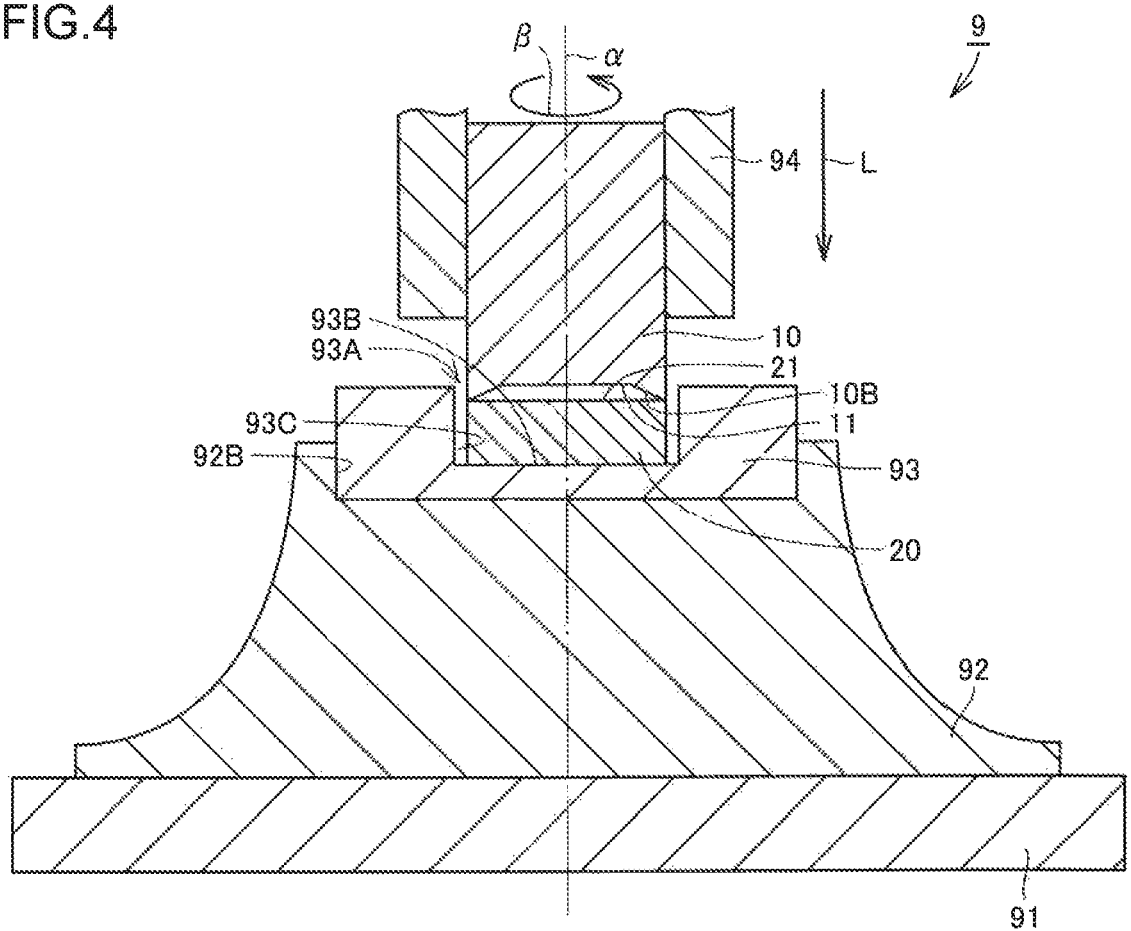
FIG. 4 is a schematic cross-sectional view showing the operation of the machine component producing device in the first embodiment.
Figure 5:
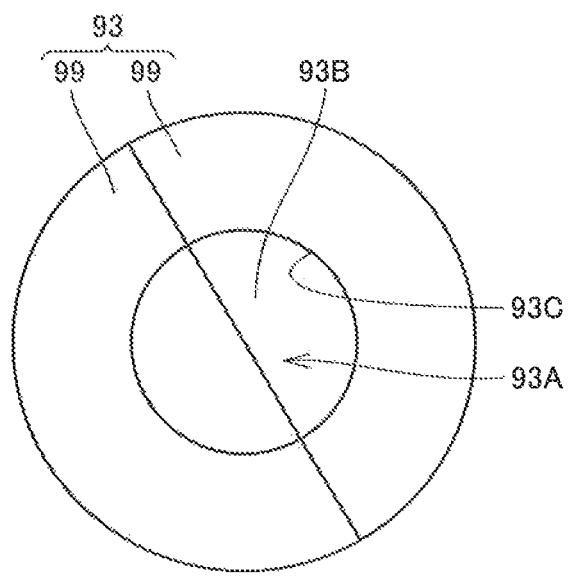
FIG. 5 is a schematic plan view showing the structure of a mold.

FIG. 2 is a flowchart schematically illustrating a machine component producing method. FIG. 3 is a schematic diagram showing the structure of a machine component producing device. FIG. 4 is a schematic cross-sectional view showing the operation of the machine component producing device. FIG. 5 is a schematic plan view showing the structure of a mold included in the machine component producing device.

Referring to FIG. 2, in the method for producing the machine component 1 in the present embodiment, first, a formed-members preparation step is carried out as a step S10. In this step S10, referring to FIG. 4, a cylindrical first member 10, made of thermally refined alloy steel for machine structural use, and a disk-shaped second member 20, made of high-strength brass, for example, are prepared. In the step S10, the first member 10 having a first linear expansion coefficient and the second member 20 having a second linear expansion coefficient greater than the first linear expansion coefficient are prepared. The second member 20 has a deformation resistance smaller than that of the first member 10. The second member 20 is a less deformation resistant member. The first member 10 is a more deformation resistant member. The first member 10 is a member to be the first region 10 of the machine component 1. The second member 20 is a member to be the second region 20 of the machine component 1.

One end face 11 of the first member 10 constitutes a first contact surface, which is to be a joint surface. An inclined portion 10B is formed to include an outer peripheral surface of the first member 10. The inclined portion 10B is a right circular conical surface the central axis of which agrees with the central axis of the first member 10.

Next, a cleaning step is carried out as a step S20. In this step S20, the first member 10 and the second member 20 prepared in the step S10 are cleaned. The first member 10 and the second member 20 are cleaned using methanol, ethanol, acetone, or other liquid. This removes any foreign matters attached to the first member 10 or the second member 20 during the cutting, machining, and other processes for preparing the first member 10 and the second member 20. In the method for producing the machine component 1 in the present embodiment, precision finish work on end faces of the second member 20 can be omitted. The end faces of the second member 20 may be left as cut.

Next, referring to FIG. 2, an enclosed friction welding step is carried out. The enclosed friction welding step includes a joining preparation step, a friction step, and a cooling step. Here, a machine component producing device for producing the machine component 1 by conducting enclosed friction welding will be described.

Referring to FIG. 3, an enclosed friction welding device 9 which is the machine component producing device includes: a spindle 95 which is rotatable about an axis α, a base portion 98 disposed spaced apart from the spindle 95 in the axis α direction, a driving portion 97 which drives the spindle 95 in the axis α directions to adjust the spacing between the spindle 95 and the base portion 98, and a frame 90 which supports the spindle 95 and the base portion 98.

Referring to FIG. 3, inside the frame 90, a shaft 90A is disposed to extend in parallel with the axis α. This shaft 90A supports a spindle support portion 90C which supports the spindle 95, so as to allow the spindle support portion 90C to move in the directions in which the shaft 90A extends. A spindle moving motor 90B for driving the shaft 90A is connected to the shaft 90A. As the shaft 90A is driven by the spindle moving motor 90B, the spindle 95 supported by the spindle support portion 90C moves in the axis α directions. This enables adjustment of the spacing between the spindle 95 and the base portion 98. The shaft 90A, the spindle support portion 90C, and the spindle moving motor 90B constitute the driving portion 97.

A rotation-side chuck 94 and a mold 93 are arranged such that, in a state (shown in FIG. 4) where the first member 10 and the second member 20 are made to contact each other with the spacing between the spindle 95 and the base portion 98 adjusted by the driving portion 97, a cavity sidewall 93C defining a cavity 93A surrounds an outer periphery of one end face 21 of the second member 20, the end face 21 constituting a second contact surface at which the second member 20 comes into contact with the first member 10. Referring to FIG. 4, the cavity sidewall 93C has a height in the axis α direction that is greater than the thickness of the second member 20.

Referring to FIG. 3, the spindle 95 includes the rotation-side chuck 94, which is a first holding portion for holding the first member 10 to oppose the base portion 98. The spindle 95 has connected thereto a spindle motor 95B which rotatively drives the spindle 95 about the axis α. The spindle 95 further has mounted thereon a load sensor 96 which detects a contact load between the first member 10 and the second member 20. The load sensor 96 detects the contact load between the first member 10 and the second member 20 from the magnitude of the contact reaction force between the first member 10 and the second member 20 that is applied to the rotation-side chuck 94. Although the load sensor 96 is not an indispensable component for the enclosed friction welding device 9, the sensor, when provided, facilitates adjusting the contact load between the first member 10 and the second member 20 to an appropriate range.

The base portion 98 has the mold 93 disposed thereon, the mold 93 being a second holding portion for holding the second member 20 to oppose the rotation-side chuck. Referring to FIGS. 3 and 4, the base portion 98 includes a base body 91, a mold holder 92, and the mold 93. The base body 91 is disposed on the frame 90. The mold holder 92 is fixed on the base body 91. The mold 93 is fitted in a mold holding portion, which is a recess formed in the mold holder 92, and the mold 93 is fixed by a radial chuck surface 92B. The mold 93 can be separated into two parts 99, 99, as shown in FIG. 5.

Referring to FIGS. 4 and 5, the mold 93 includes: a cavity bottom wall 93B which is a circular flat surface, and the cavity sidewall 93C which extends from the cavity bottom wall 93B in a direction intersecting (direction perpendicular to) the cavity bottom wall 93B. The cavity bottom wall 93B and the cavity sidewall 93C define the cavity 93A. The cavity sidewall 93C is connected to the outer periphery of the cavity bottom wall 93B of the circular shape, and it has a cylindrical surface shape having the same diameter as the cavity bottom wall 93B.

A specific procedure of the enclosed friction welding step will now be described. Referring to FIGS. 3 and 4, in the joining preparation step carried out as a step S30, the first member 10 is held at the outer peripheral surface by the rotation-side chuck 94. The second member 20 is set in the cavity 93A of the mold 93. The one end face 21 of the second member 20 is surrounded by the cavity sidewall 93C.

The second member 20 is arranged such that its end face contacts the cavity bottom wall 93B defining the cavity 93A. The first member 10 and the second member 20 are arranged such that the one end face 11 of the first member 10 and the one end face 21 of the second member 20 oppose each other, and that the central axes of the first member 10 and the second member 20 agree with the rotational axis α of the rotation-side chuck.

A release agent is introduced into the cavity 93A. Thus, in a step S40 described below, the first member 10 and the second member 20 are heated in the presence of the release agent in the cavity 93A. Although introduction of the release agent is not an indispensable procedure, the release agent, when introduced, facilitates removal of a structural body formed with the first member 10 and the second member 20 joined together, from the mold 93 in a step S50 described later. The release agent may be liquid or powder.

Next, the friction step is carried out as a step S40. In this step S40, the spindle 95 is driven by the spindle motor 95B to rotate about the axis α, and it is also driven by the spindle moving motor 90B to approach the base portion 98. Consequently, the rotation-side chuck 94 approaches the mold 93 while rotating about the axis α.

The first member 10 relatively rotates about the rotational axis α, while being pressed against the second member 20, without changing its positional relationship relative to the second member 20. The temperature increases at the contact portions of the first member 10 and the second member 20 because of the frictional heat. The first member 10 and the second member 20 are heated with the frictional heat. The temperature of the second member 20 increases, for example, to a temperature that is not lower than the softening point and lower than the melting point of the second metal constituting the second member 20.

The second member 20 is smaller in deformation resistance than the first member 10, as explained above. The second member 20 heated is softened and deformed, and it comes into contact with the cavity sidewall 93C of the mold 93. This prevents the second member 20 from rotating together with the first member 10, and also prevents further deformation of the second member 20. Consequently, further heat is generated by the friction between the first member 10 and the second member 20, and the generated heat is prevented from being released from within the cavity 93A.

The second member 20, heated and thus softened and deformed, comes into contact with the inclined portion 10B of the first member 10. With the first member 10 pressed against the second member 20, the second member 20 is deformed so as to contact the inclined portion 10B of the first member 10.

Next, the cooling step is carried out as a step S50. In this step S50, first, the rotational speed of the spindle 95 is lowered, and the rotation is stopped. Thereafter, the pressing load detected by the load sensor 96 is decreased. During this time, the first member 10 and the second member 20 are cooled, while being maintained in the state of being pressed against each other. The first member 10 and the second member 20 are cooled in the state of contacting each other. Accordingly, the first member 10 and the second member 20 are joined directly. In the above step S40, the second member 20 as the less deformation resistant member is deformed, whereby an interface between the first member 10 and the second member 20 is formed such that the region including the outer periphery is inclined toward the second member 20 side over the entire periphery.

The pressing load is then set to zero, and the machine component 1, which is the structural body formed with the first region 10 corresponding to the first member 10 and the second region 20 corresponding to the second member 20 joined together, is taken out of the enclosed friction welding device 9 (see FIG. 1). The enclosed friction welding step is completed by the procedure described above.

Next, a machining step is carried out as a step S60. In this step S60, the machine component 1 obtained in the step S50 is subjected to machining. Specifically, in the step S60, flash that has been formed due to deformation of the second member 20 in the step S40 is removed. Next, referring to FIG. 1, a groove 19 is formed on the surface of the first member 10 (first region 10), to extent along the outer periphery 5A of the interface 5 between the first member 10 (first region 10) and the second member 20 (second region 20) formed with the first member 10 and the second member 20 joined.

Next, a gas nitrocarburizing step is carried out as a step S70. In this step S70, the gas nitrocarburizing processing is performed, as heat treatment, on the machine component 1 obtained through the machining in the step S60. Specifically, while being heated within an atmosphere including ammonia gas to a temperature lower than the $A_1$ transformation point of the steel constituting the first member 10 (first region 10), a nitrided layer is formed in the surface portion of the first member 10 (first region 10). At this time, the presence of the inclined portion 5B and the groove 19 prevents cracking in the vicinity of the outer periphery 5A of the interface 5. Thereafter, finishing work is performed as required, whereby the machine component 1 of the present embodiment is completed. The machine component 1 of the present embodiment can be produced by the above procedure.

Second Embodiment

Figure 6:
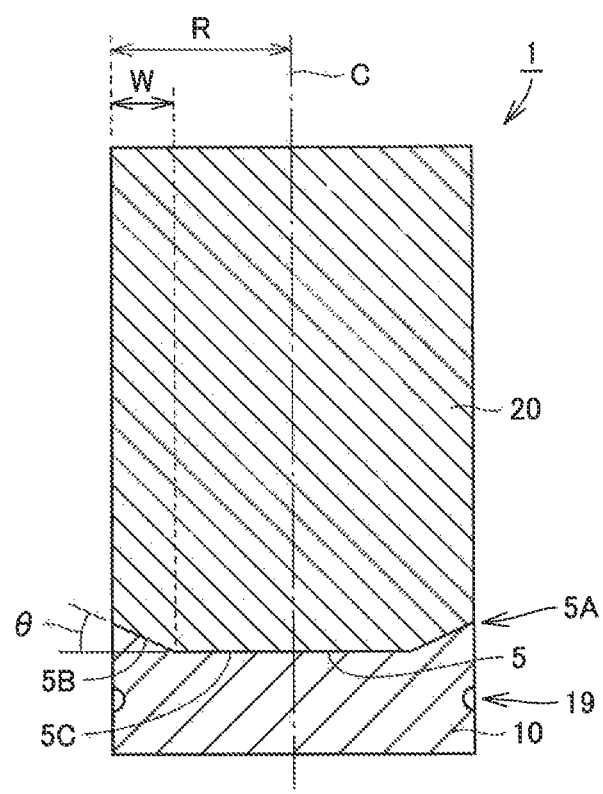
FIG. 6 is a schematic cross-sectional view showing the structure of a machine component according to a second embodiment.

A second embodiment as another embodiment of the present invention will now be described. FIG. 6 is a schematic cross-sectional view showing the structure of a machine component according to the second embodiment. Referring to FIG. 6, the machine component 1 according to the second embodiment has a structure in which a first member 10 made of a first metal and a second member 20 made of a second metal are joined together, as in the first embodiment. The second embodiment, however, differs from the first embodiment in that the first member 10 made of the first metal has a disk shape and the second member 20 has a cylindrical shape. For the first metal and the second metal, similar metals as in the first embodiment are adopted.

Referring to FIG. 6, the first region 10 and the second region 20 are joined at an interface 5 which is a joint surface. The first region 10 has a first linear expansion coefficient. The second region 20 has a second linear expansion coefficient greater than the first linear expansion coefficient. The first region 10 has a diameter identical to that of the second region 20.

The second region 20 is smaller in deformation resistance than the first region 10. The first region 10 and the second region 20 have the cylindrical shape which is axisymmetric, as explained above. The first region 10 and the second region 20 have central axes that agree with a central axis C of the machine component. The first region 10 and the second region 20 are arranged coaxially.

The interface 5 includes a central portion 5C which is a flat surface perpendicular to the central axis C, and an inclined portion 5B which is a surface inclined toward the second region 20 side with respect to a plane perpendicular to the central axis C. The interface 5 includes the inclined portion 5B of an annular shape, which portion includes an outer periphery 5A of the interface 5 and is inclined toward the second region 10 side. The central portion 5C is a circular flat surface. The inclined portion 5B is a right circular conical surface the central axis of which agrees with the central axis C. With the presence of the inclined portion 5B, the region including the outer periphery 5A of the interface 5 is inclined toward the second region 10 side over the entire periphery.

One end of the second region 20 on the first region 10 side has a convex shape that protrudes toward the first region 10. One end of the first region 10 on the second region 20 side has a concave shape corresponding to the end of the second region 20 of the convex shape. A width W of the inclined portion 5B in a direction perpendicular to the central axis C is at least 1/20 and not greater than 1/10 of a radius R of a circle circumscribing the outer periphery 5A of the interface 5 (radius R of the first region 10). An angle θ that the inclined portion 5B makes with a plane perpendicular to the central axis C can be at least 5° and not greater than 15°, for example.

The first region 10 has a surface (outer peripheral surface) on which a groove 19 is formed to extend along the outer periphery 5A of the interface 5. The groove 19 is formed continuously over the entire periphery along the outer periphery 5A of the interface 5. The groove 19 extends in parallel with the outer periphery 5A of the interface 5. The shape of the groove 19 is similar to that in the first embodiment.

The machine component 1 as described above can be produced by a machine component producing method according to the present embodiment as follows. The machine component producing method in the present embodiment is a producing method using enclosed friction welding, as in the case of the first embodiment. In the first embodiment, the enclosed friction welding is carried out with the first member 10 as the more deformation resistant member being rotated, while the second member 20 as the less deformation resistant member is arranged in the mold 93. In the second embodiment, the enclosed friction welding is carried out with the second member 20 as the less deformation resistant member being rotated, while the first member 10 as the more deformation resistant member is fixed. The machine component producing method according to the second embodiment is applicable in the case where it is difficult to rotate the first member 10 as the more deformation resistant member.

Figure 7:
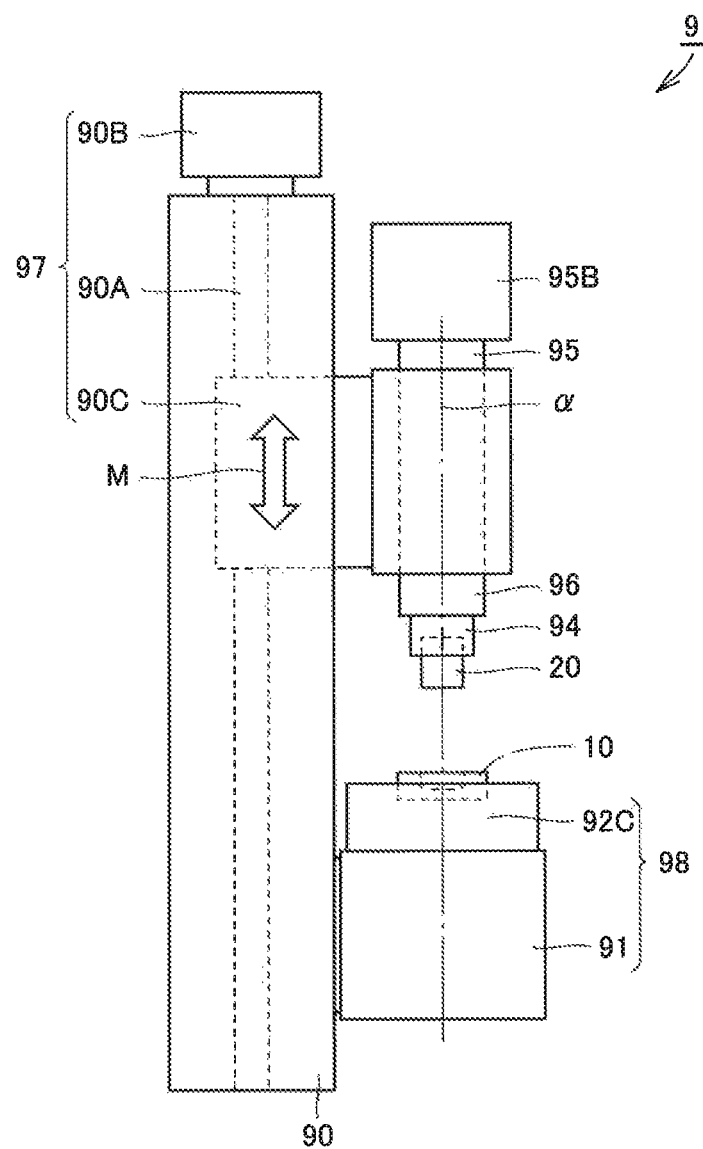
FIG. 7 is a schematic diagram showing the structure of a device for producing a machine component in the second embodiment.
Figure 8:
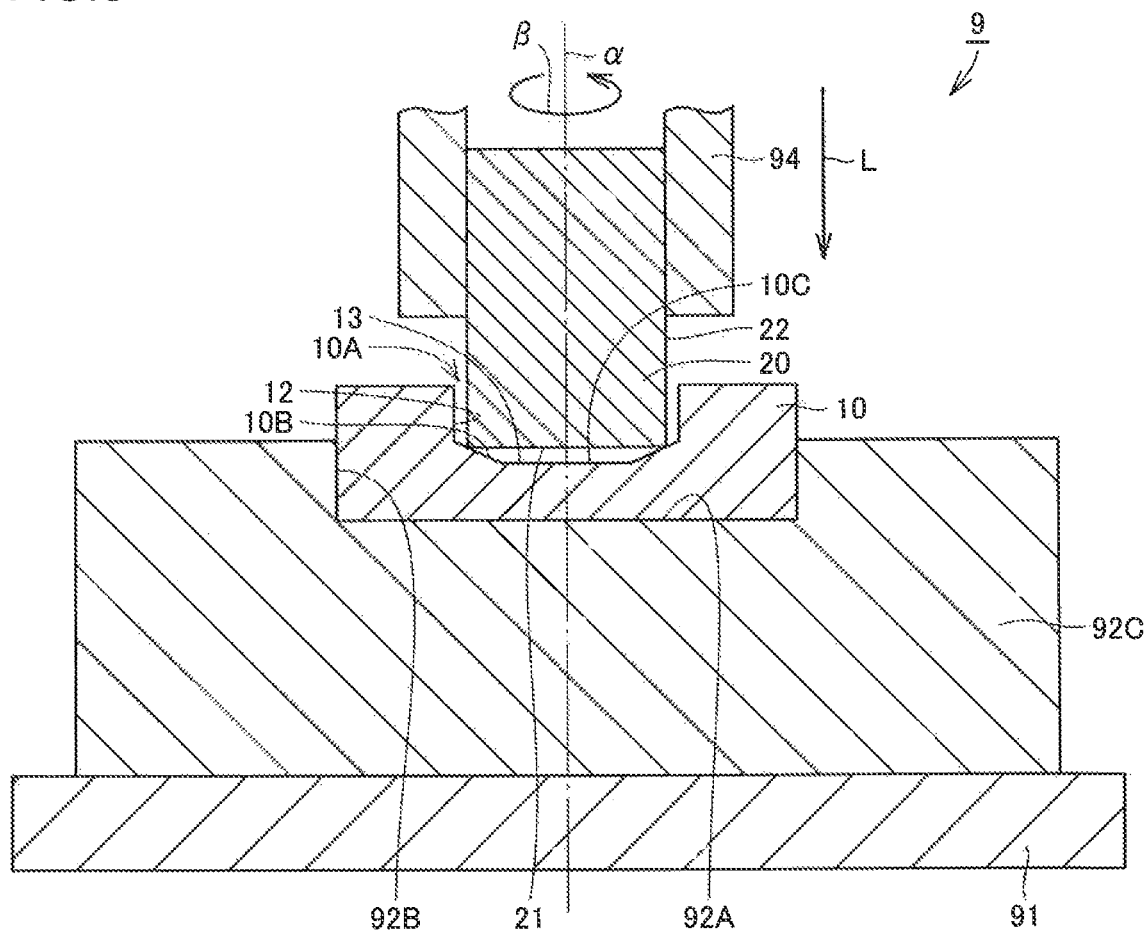
FIG. 8 is a schematic cross-sectional view showing the operation of the machine component producing device in the second embodiment.
Figure 9:
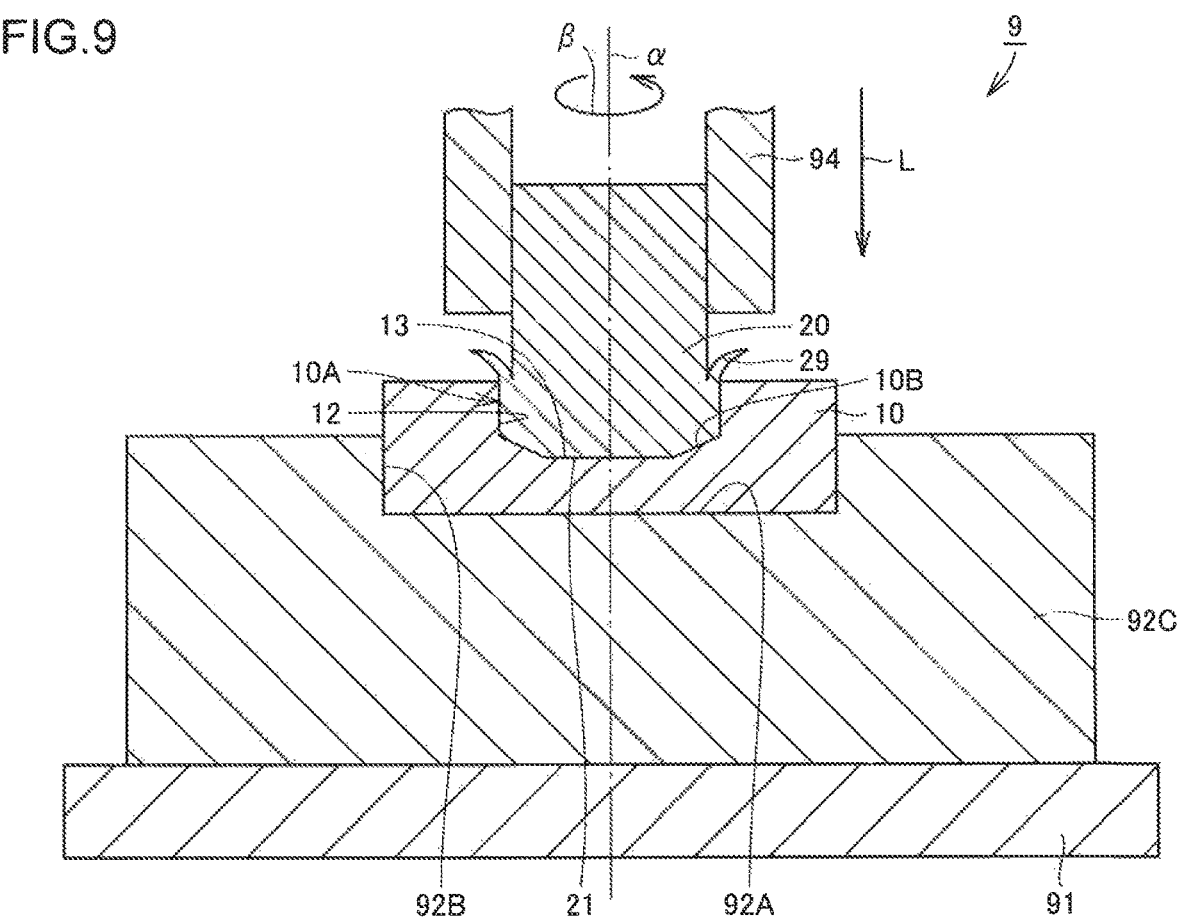
FIG. 9 is a schematic cross-sectional view illustrating a method for producing a machine component in the second embodiment.
Figure 10:
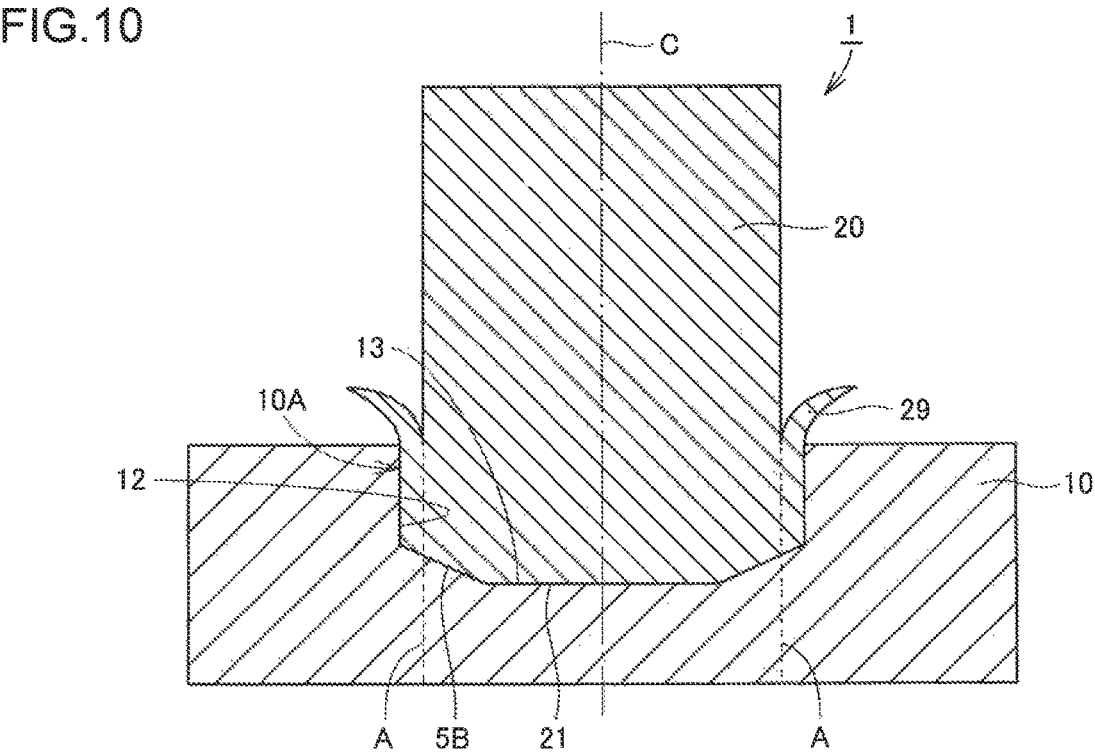
FIG. 10 is another schematic cross-sectional view illustrating the method for producing a machine component in the second embodiment.

FIG. 2 is a flowchart schematically illustrating the machine component producing method. FIG. 7 is a schematic diagram showing the structure of a machine component producing device. FIG. 8 is a schematic cross-sectional view showing the operation of the machine component producing device. FIGS. 9 and 10 are schematic cross-sectional views illustrating the machine component producing method.

Referring to FIG. 2, in the method for producing the machine component 1 in the present embodiment, first, a formed-members preparation step is carried out as a step S10. In this step S10, referring to FIG. 8, a first member 10, made of thermally refined alloy steel for machine structural use, and a second member 20, made of high-strength brass, for example, are prepared. The second member 20 has a cylindrical shape. In the step S10, the first member 10 having a first linear expansion coefficient and the second member 20 having a second linear expansion coefficient greater than the first linear expansion coefficient are prepared. The second member 20 has a deformation resistance smaller than that of the first member 10. The second member 20 is a less deformation resistant member. The first member 10 is a more deformation resistant member. The first member 10 is a member to be the first region 10 of the machine component 1. The second member 20 is a member to be the second region 20 of the machine component 1.

The first member 10 has a cylindrical shape (disk shape). The first member 10 has a recess 10A. The recess 10A is formed to include a central axis of the first member 10. The recess 10A is of a cylindrical shape. The central axis of the first member 10 and the central axis of the recess 10A agree with each other. The first member 10 includes a recess bottom wall 13, which defines the recess 10A, and a recess sidewall 12, which defines the recess 10A and extends in a direction intersecting the recess bottom wall 13.

The recess bottom wall 13 constitutes a first contact surface, which is to be a joint surface. In a region including an outer periphery of the recess bottom wall 13, an inclined portion 10B is formed which is inclined, with respect to a plane perpendicular to the central axis of the first member 10, toward the side closer to the inlet of the recess 10A. The inclined portion 10B is a right circular conical surface the central axis of which agrees with the central axis of the first member 10. The inclined portion 10B thus formed produces, in the region including the outer periphery of the recess 10A, a region having its depth reduced gradually with decreasing distance from the outer periphery. The recess bottom wall 13 has a convex shape that protrudes toward the side opposite to the inlet side of the recess 10A. The recess bottom wall 13 includes the inclined portion 10B arranged to include the outer periphery, and a central portion 10C which is a circular flat surface perpendicular to the central axis of the first member 10 and surrounded by the inclined portion 10B. One end face 21 of the second member 20 constitutes a second member contact surface, which is to be joined to the first member 10.

Next, a cleaning step is carried out as a step S20. This step S20 is performed similarly as in the first embodiment. In the method for producing the machine component 1 in the present embodiment, precision finish work on the one end face 21 of the second member 20 can be omitted. The one end face 21 of the second member 20 may be left as cut.

Next, referring to FIG. 2, an enclosed friction welding step is carried out. The enclosed friction welding step includes a joining preparation step, a friction step, and a cooling step. Here, a machine component producing device for producing a machine component 1 by conducting enclosed friction welding will be described.

Referring to FIG. 7, the enclosed friction welding device 9 as the machine component producing device in the second embodiment basically has a similar structure as and operates in a similar manner as in the case of the first embodiment. The differences from the first embodiment will be described below.

The spindle 95 includes a rotation-side chuck 94, which holds the second member 20 to oppose the base portion 98. The base portion 98 has disposed thereon a fixed-side chuck 92C, which holds the first member 10 to oppose the rotation-side chuck 94. Referring to FIGS. 7 and 8, the base portion 98 includes a base body 91 and the fixed-side chuck 92C. The fixed-side chuck 92C is fixed on the base body 91. The fixed-side chuck 92C includes a bottom surface 92A, which holds the first member 10 in the axial direction, and a radial chuck surface 92B, which holds the first member 10 in the radial direction.

A specific procedure of the enclosed friction welding step will now be described. Referring to FIG. 7, in the joining preparation step carried out as a step S30, the second member 20 is held at the outer peripheral surface by the rotation-side chuck 94. The first member 10 is held at the outer peripheral surface by the fixed-side chuck 92C.

The first member 10 and the second member 20 are arranged such that the recess bottom wall 13 of the first member 10 and the one end face 21 of the second member 20 oppose each other, and that the central axes of the first member 10 and the second member 20 agree with the rotational axis α of the rotation-side chuck 94.

Next, the friction step is carried out as a step S40. In this step S40, the spindle 95 is driven by the spindle motor 95B to rotate about the axis α, and it is also driven by the spindle moving motor 90B to approach the base portion 98. Consequently, the rotation-side chuck 94 approaches the fixed-side chuck 92C while rotating about the axis α.

Then, as shown in FIG. 8, in a state where at least a part (a region including the one end face 21) of the second member 20 is received in the recess 10A, the second member 20 relatively rotates, while being pressed against the first member 10 with a prescribed load, without changing its position relative to the first member 10. The second member 20 rotates while being relatively pressed against the recess bottom wall 13 of the first member 10. This increases the temperatures of the first member 10 and the second member 20 because of the frictional heat.

At the beginning of rotation, there is a gap between an outer peripheral surface 22 of the second member 20 and the recess sidewall 12 of the first member 10. At the start of rotation, the outer peripheral surface 22 of the second member 20 is not in contact with the recess sidewall 12 of the first member 10. At the beginning of rotation, there is a gap between the one end face 21 of the second member 20 and the central portion 10C of the recess bottom wall 13. At the start of rotation, the one end face 21 of the second member 20 is not in contact with the central portion 10C of the recess bottom wall 13. With the rotation continued, the first member 10 and the second member 20 are heated with the heat produced by friction.

As explained above, the deformation resistance of the second member 20, which is a less deformation resistant member, is smaller than that of the first member 10. Referring to FIG. 9, the heated second member 20 is softened and deformed, and comes into contact with the recess sidewall 12. The deformation of the second member 20 is limited by the wall surfaces (recess bottom wall 13 and recess sidewall 12) defining the recess 10A of the first member 10. This prevents the heat generated by the friction from being released from within the recess 10A. The second member 20 heated and thus softened and deformed comes into contact with the central portion 10C. The recess 10A is filled with the softened second member 20. Flash 29 is formed due to deformation of the second member 20.

Next, the cooling step is carried out as a step S50. In this step S50, first, the rotational speed of the spindle 95 is lowered, and the rotation is stopped. Thereafter, the pressing load detected by the load sensor 96 is decreased. During this time, the first member 10 and the second member 20 are cooled, while being maintained in the state of being pressed against each other. The first member 10 and the second member 20 are cooled in the state of contacting each other. Accordingly, the first member 10 and the second member 20 are joined directly. In the above step S40, with the second member 20 as the less deformation resistant member deformed, an interface between the first member 10 and the second member 20 is formed such that the region including the outer periphery is inclined toward the second member 20 side over the entire periphery.

The pressing load is then set to zero, and the machine component 1, which is the structural body formed with the first member 10 and the second member 20 joined together, is taken out of the enclosed friction welding device 9 (see FIG. 10). The enclosed friction welding step is completed by the procedure described above.

Next, a machining step is carried out as a step S60. In this step S60, the machine component 1 obtained in the step S50 is subjected to machining. Specifically, referring to FIG. 10, in the step S60, the first member 10 is machined, in the state where the first member 10 and the second member 20 are joined together, to remove the recess sidewall 12. The first member 10 and the second member 20 are cut along the broken lines A, so that the outer peripheral region including the recess sidewall 12 and the flash 29 are removed. The removal of the outer peripheral region including the recess sidewall 12 and the removal of the flash 29 may be performed continuously as a single step, or may be performed as separate steps at different times.

Next, referring to FIG. 6, a groove 19 is formed on a surface of the first member 10 (first region 10), to extend along the outer periphery 5A of the interface 5 between the first member 10 (first region 10) and the second member 20 (second region 20) formed with the first member 10 and the second member 20 joined together.

Next, a gas nitrocarburizing step is carried out as a step S70. In this step S70, the gas nitrocarburizing processing is performed, as heat treatment, on the machine component 1 obtained through the machining in the step S60. Specifically, while being heated within an atmosphere including ammonia gas to a temperature lower than the $A_1$ transformation point of the steel constituting the first member 10 (first region 10), a nitrided layer is formed in the surface portion of the first member 10 (first region 10). At this time, the presence of the inclined portion 5B and the groove 19 prevents cracking in the vicinity of the outer periphery 5A of the interface 5. Thereafter, finishing work is performed as required, whereby the machine component 1 of the present embodiment is completed. The machine component 1 of the present embodiment can be produced by the above procedure.

In the step S40 in the first and second embodiments described above, the deformation resistance of the second member 20 (less deformation resistant member) in the temperature increased state is preferably smaller by 10% or more, more preferably smaller by 50% or more, and further preferably smaller by 80% or more, as compared to the deformation resistance of the first member 10 (more deformation resistant member) in the temperature increased state. As explained above, the first member 10 and the second member 20 can be joined as in the present embodiments in the case where the second member 20 (less deformation resistant member) is smaller in deformation resistance than the first member 10 (more deformation resistant member). If the difference in deformation resistance between the first member 10 and the second member 20 is small, however, not only the second member 20, but also the first member 10 may be deformed in the step S40.

In such a case, it will be difficult to join the first member 10 and the second member 20 satisfactorily, making it necessary to strictly manage the temperatures of the first member 10 and the second member 20 in the step S40. Setting the deformation resistance of the second metal in the temperature increased state smaller than that of the first metal by 10% or more in the step S40 facilitates achievement of good joining, and setting the same smaller by 50% or more, or even 80% or more, can further facilitate the achievement of good joining.

In the first and second embodiments described above, the method of producing the machine component 1 was described by taking as an example the case where the first member 10 is a more deformation resistant member and the second member 20 is a less deformation resistant member. Even in the case where the first member 10 is a less deformation resistant member and the second member 20 is a more deformation resistant member, the machine component 1 can be produced, by the producing method using enclosed friction welding, when the surfaces (joint surfaces) of the first member 10 and the second member 20 which will oppose each other in the enclosed friction welding are formed into appropriate shapes in consideration of the linear expansion coefficients.

Figure 11:
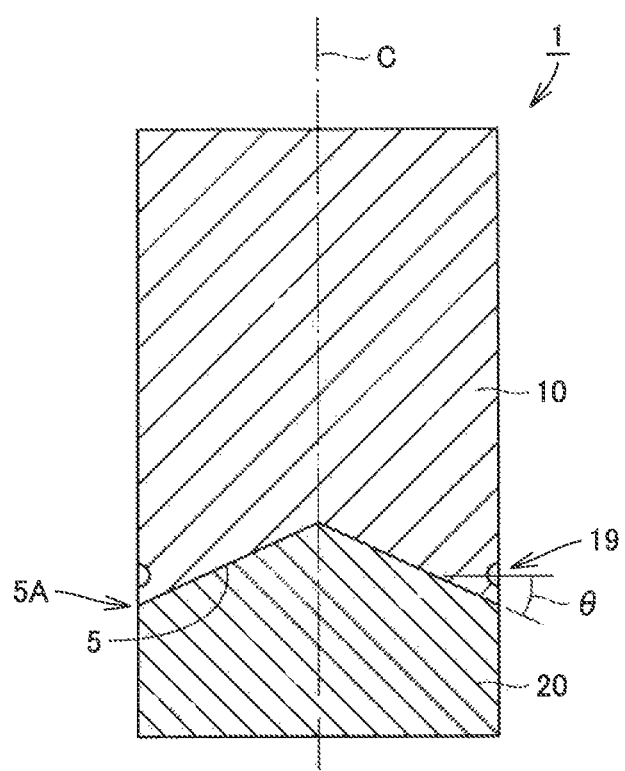
FIG. 11 is a schematic cross-sectional view showing a modification of the structure of a machine component.
Figure 12:
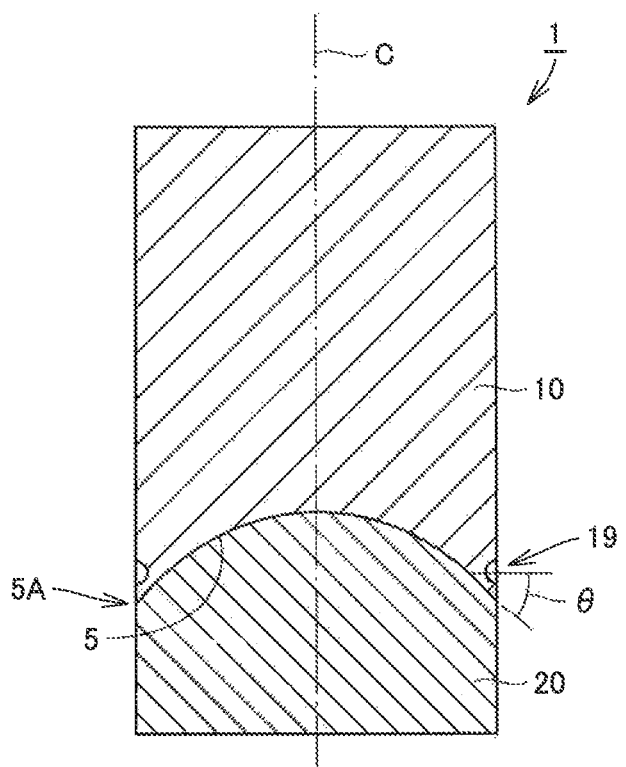
FIG. 12 is a schematic cross-sectional view showing another modification of the structure of a machine component.

The shape of the interface between the first region and the second region of the machine component of the present invention is not limited to the one illustrated in the above embodiments. The interface between the first region and the second region can take various shapes in which the region including the outer periphery of the interface is inclined toward the second region side over the entire periphery. The interface 5 may be of a circular conical surface shape having the vertex located on the central axis C, like a first modification shown in FIG. 11. In the first modification, the interface 5 is entirely an inclined portion, with no central portion as a flat surface perpendicular to the central axis C. Further, the interface 5 may be of a spherical shape having its center on the central axis C, like a second modification shown in FIG. 12. The interface 5 may be a curved surface as in the second modification.

EXAMPLES

Example 1

Assuming a machine component 1 (Example A) of the first embodiment shown in FIG. 1, the magnitude of thermal stress generated in the vicinity of the outer periphery 5A of the interface 5 was analyzed using the finite element method (FEM). The angle θ made by the inclined portion 5B with a plane perpendicular to the central axis C was set to 10°. The width W of the inclined portion 5B was set to 1 mm. For the material constituting the first region 10, JIS SCM440 (tempered and quenched), being steel (alloy steel for machine structural use), was adopted. For the material constituting the second region 20, high-strength brass was adopted. Thermal stress was analyzed for the case of applying heat treatment in which the machine component 1 was heated from 60° C. to 570° C. and then cooled to 60° C. The analysis was conducted on the conditions that the linear expansion coefficients were constant irrespectively of the temperature and that no plastic deformation occurred.

For comparison, similar analysis was also conducted on one (Comparative Example A) having no inclined portion 5B on the interface 5, or, having the interface 5 entirely made up of a surface perpendicular to the central axis C, and on another one (Comparative Example B) having the inclined portion 5B inclined toward the first region 10 side by the angle of 10° between the inclined portion 5B and a plane perpendicular to the central axis C. Table 1 below shows a maximum value of thermal stress in the vicinity of the outer periphery 5A of the interface 5 obtained as a result of analysis.

TABLE 1

|  | Thermal stress (MPa) |
| --- | --- |
| Example A | 179 |
| Comparative Example A | 387 |
| Comparative Example B | 616 |

Referring to Table 1, when the inclined portion is provided as in Comparative Example B so as to be inclined toward the side opposite to the side in the case of the present invention, then the thermal stress becomes greater as compared to Comparative Example A. On the other hand, in the case of Example A, which is an example of the present invention, the thermal stress is reduced to about ½ as compared to Comparative Example A having no inclined portion. Further, it has been found through the analysis with the FEM that, in Example A, the thermal stress is distributed over a wider range toward a region on the inner peripheral side of the interface and toward the outer peripheral surface of the first region side, as compared to the case of Comparative Example A. The above analysis results confirm that forming the region including the outer periphery of the interface between the first region and the second region so as to be inclined toward the second region side over the entire periphery makes it possible to distribute the thermal stress and reduce the maximum value of the thermal stress.

Example 2

Ten pieces of machine components 1 (Example B) of the first embodiment shown in FIG. 1 were produced by conducting the steps S10 to S70 in the first embodiment. The obtained machine components 1 were subjected to an experiment in which the number of cracks, and lengths thereof, formed in the vicinity of the outer periphery 5A of the interface 5 were confirmed. The angle θ made by the inclined portion 5B with a plane perpendicular to the central axis C was set to 10°. The width W of the inclined portion 5B was set to 1 mm. For the material constituting the first region 10, JIS SCM440 (tempered and quenched), being steel (alloy steel for machine structural use), was adopted. For the material constituting the second region 20, high-strength brass was adopted. For comparison, ten pieces of components (Comparative Example C) having a structure similar to that of Example B but including no inclined portion 5B in the interface 5, i.e. having the interface 5 entirely made up of a surface perpendicular to the central axis C, were produced by a similar procedure, and the number of cracks and lengths thereof were confirmed in a similar manner.

Figure 13:
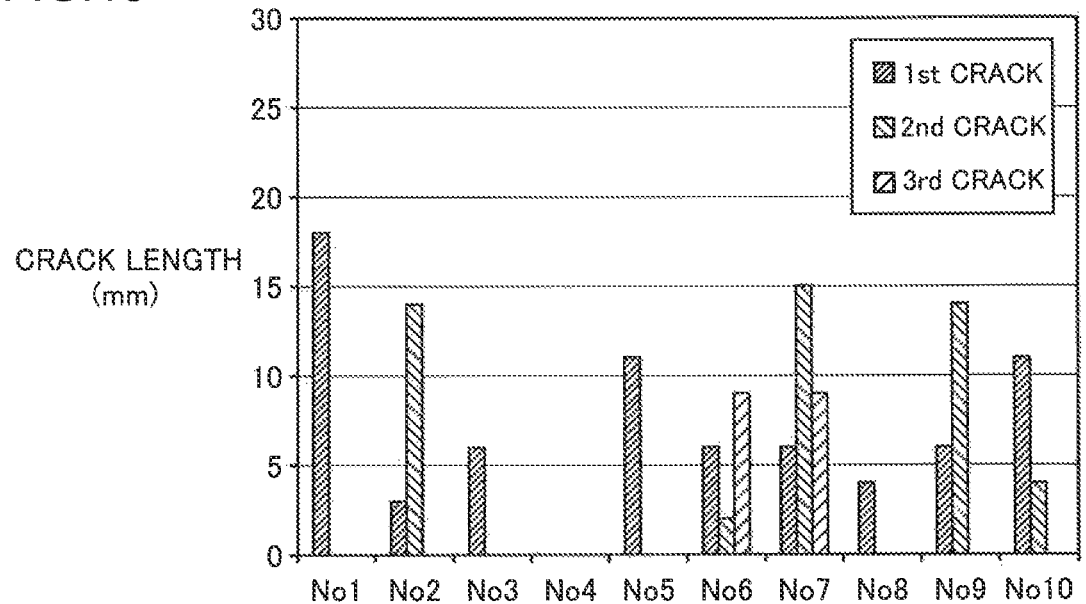
FIG. 13 shows the number of cracks, and their lengths, generated in a joint surface (Comparative Example)
Figure 14:
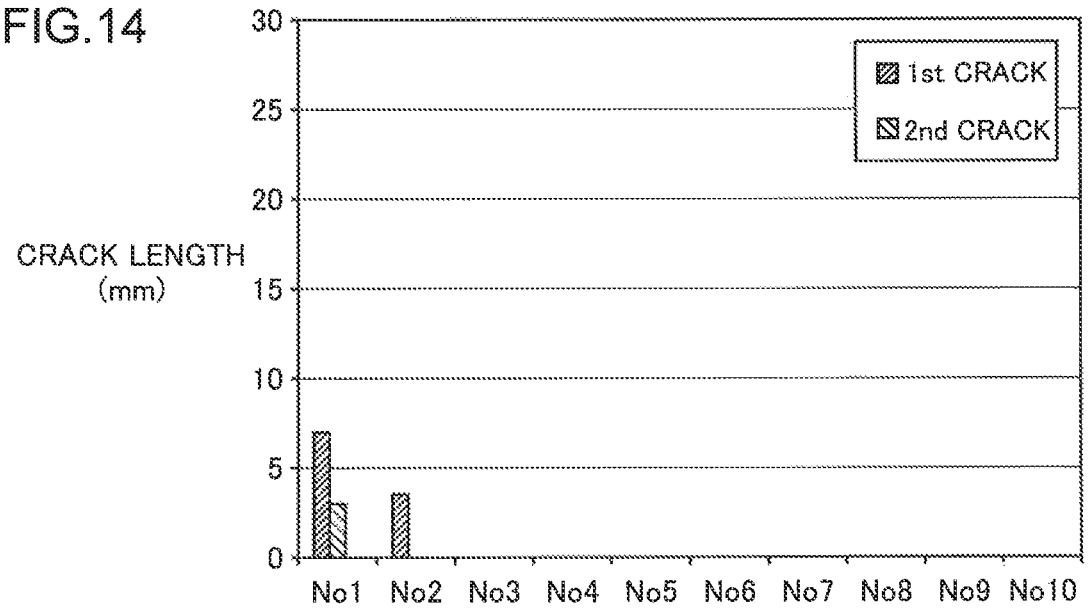
FIG. 14 shows the number of cracks, and their lengths, generated in a joint surface (Example).

FIG. 13 shows the number of cracks, and lengths thereof, observed in Comparative Example C. FIG. 14 shows the number of cracks, and lengths thereof, observed in Example B. In FIGS. 13 and 14, Nos. 1 to 10 indicated along the horizontal axis represent the ten samples produced. In FIGS. 13 and 14, the vertical axis represents crack length. The lengths of cracks in each sample are expressed as follows. When one crack is observed, its length is expressed by one bar. When two cracks are observed, their lengths are expressed by two bars corresponding respectively to the first and second cracks. When three cracks are observed, their lengths are expressed by three bars corresponding respectively to the first, second, and third cracks.

Referring to FIGS. 13 and 14, it is confirmed that according to the machine components of Example B, which is an example of the present invention, the number of cracks and their lengths are reduced distinctly as compared to Comparative Example C, which is outside the scope of the present invention. In Example B, no cracks were observed in eight samples out of the ten samples. The above experimental results confirm that, according to the machine component of the present invention, cracking due to thermal stress generated in a joint surface can be prevented in the machine component with members having different linear expansion coefficients joined together without the use of a brazing material.

While the case of adopting steel as the material (first metal) constituting the first region (member) and brass as the material (second metal) constituting the second region (member) has been illustrated in the embodiments and examples above, the materials adoptable in the present invention are not limited to them. Examples of combination of adoptable metals are shown in Table 2 below.

TABLE 2

| First region (member) | Second region (member) |
|---|---|
| Steel | Brass |
| Steel | Aluminum-based alloy |
| Nickel-based alloy | Steel |
| Cemented carbide | Steel |

As shown in Table 2, in the machine component and its producing method of the present invention, various combinations of the first region (member) made of a first metal and the second region (member) made of a second metal having a greater linear expansion coefficient than the first metal can be adopted.

It should be understood that the embodiments and examples disclosed herein are illustrative and non-restrictive in every respect. The scope of the present invention is defined by the terms of the claims, rather than the description above, and is intended to include any modifications and improvements within the scope and meaning equivalent to the terms of the claims.

INDUSTRIAL APPLICABILITY

The machine component and its producing method according to the present invention are applicable particularly advantageously to a machine component having a structure in which regions with different linear expansion coefficients are joined directly to each other and to production thereof.

DESCRIPTION OF REFERENCE NUMERALS

1: machine component; 5: interface; 5A: outer periphery; 5B: inclined portion; 5C: central portion; 9: enclosed friction welding device; 10: first region (first member); 10A: recess; 10B: inclined portion; 10C: central portion; 11: end face; 12: recess sidewall; 13: recess bottom wall; 19: groove; 20: second region (second member); 21: end face; 22: outer peripheral surface; 29: flash; 90: frame; 90A: shaft; 90B: spindle moving motor; 90C: spindle support portion; 91: base body; 92: mold holder; 92A: bottom surface; 92B: radial chuck surface; 92C: fixed-side chuck; 93: mold; 93A: cavity; 93B: cavity bottom wall; 93C: cavity sidewall; 94: rotation-side chuck; 95: spindle; 95B: spindle motor; 96: load sensor; 97: driving portion; 98: base portion; and 99: part.

The invention claimed is:

1. A machine component, comprising:
a first region having a first linear expansion coefficient; and
a second region that is joined to the first region and has a second linear expansion coefficient greater than the first linear expansion coefficient, wherein:
an outer diameter of the first region is identical to an outer diameter of the second region;
abutting conical surfaces of the first region and the second region form an inclined portion of an interface between the first region and the second region, the inclined portion (i) extending to radially outermost surfaces of the first and second regions so as to include an outer periphery of the interface and (ii) being inclined toward the second region over an entirety of the inclined portion so that a radially inner end of the inclined portion is more toward a first region side of the machine component than a radially outer end of the inclined portion; and
the radially outermost surface of the first region has a groove formed thereon, the groove extending parallel to the outer periphery of the interface.

2. The machine component according to claim 1, wherein the groove is formed continuously over an entire periphery of the radially outermost surface of the first region.

3. The machine component according to claim 1, wherein the inclined portion is annular in shape.

4. The machine component according to claim 2, wherein the inclined portion is annular in shape.

5. The machine component according to claim 3, wherein the first region and the second region are of an axisymmetric shape and arranged coaxially, and
a width of the inclined portion in a direction perpendicular to an axial direction of the first and second regions is at least 1/20 and not greater than 1/10 of a radius of a circle circumscribing the outer periphery of the interface.

6. The machine component according to claim 4, wherein the first region and the second region are of an axisymmetric shape and arranged coaxially, and
a width of the inclined portion in a direction perpendicular to an axial direction of the first and second regions is at least 1/20 and not greater than 1/10 of a radius of a circle circumscribing the outer periphery of the interface.

7. A machine component producing method, comprising:
preparing a first region having a first linear expansion coefficient and a second region having a second linear expansion coefficient greater than the first linear expansion coefficient, an outer diameter of the first region being identical to an outer diameter of the second region;
joining the first region and the second region; and
forming on a radially outermost surface of the first region a groove extending parallel to an outer periphery of an interface between the first region and the second region formed with the first region and the second region joined together,
the joining of the first region and the second region including
heating the first region and the second region by relatively rotating the first region and the second region with respect to each other about an axis of rotation, while pressing the first region and the second region against each other, without changing a relative positional relationship between the first region and the second region, and cooling the first region and the second region heated, with the regions being pressed against each other, and in the joining of the first region and the second region, the interface between the first region and the second region being formed, in the heating of the first region and the second region and by deformation of a less deformation resistant region, which is one of the first region and the second region smaller in deformation resistance than the other, so as to include an inclined portion formed by abutting conical surfaces of the first region and the second region, the inclined portion (i) extending to radially outermost surfaces of the first and second regions so as to include the outer periphery of the interface and (ii) being inclined toward the second region over an entirety of the inclined portion so that a radially inner end of the inclined portion is more toward a first region side of the machine component than a radially outer end of the inclined portion.

8. The machine component producing method according to claim 7, further comprising subjecting the first region and the second region to heat treatment after the formation of the groove on the first region.

9. The machine component producing method according to claim 7, wherein in the heating of the first region and the second region, the less deformation resistant region is disposed in a cavity of a mold.

10. The machine component producing method according to claim 8, wherein in the heating of the first region and the second region, the less deformation resistant region is disposed in a cavity of a mold.

11. The machine component producing method according to claim 9, wherein the mold includes
a cavity bottom wall defining the cavity, and
a cavity sidewall defining the cavity and extending in a direction intersecting the cavity bottom wall.

12. The machine component producing method according to claim 10, wherein the mold includes
a cavity bottom wall defining the cavity, and
a cavity sidewall defining the cavity and extending in a direction intersecting the cavity bottom wall.

13. The machine component producing method according to claim 11, wherein in the heating of the first region and the second region, a second contact surface, being a surface of the second region coming into contact with the first region, is surrounded by the cavity sidewall.

14. The machine component producing method according to claim 12, wherein in the heating of the first region and the second region, a second contact surface, being a surface of the second region coming into contact with the first region, is surrounded by the cavity sidewall.

15. The machine component producing method according to claim 7, wherein
a more deformation resistant region, which is one of the first region and the second region greater in deformation resistance than the other, has a recess formed therein, and
in the heating of the first region and the second region, the less deformation resistant region in a state of being at least partially received in the recess is relatively rotated with respect to the more deformation resistant region, while being relatively pressed against the more deformation resistant region, for heating the first region and the second region.

16. The machine component producing method according to claim 8, wherein
a more deformation resistant region, which is one of the first region and the second region greater in deformation resistance than the other, has a recess formed therein, and
in the heating of the first region and the second region, the less deformation resistant region in a state of being at least partially received in the recess is relatively rotated with respect to the more deformation resistant region, while being relatively pressed against the more deformation resistant region, for heating the first region and the second region.

17. The machine component producing method according to claim 15, wherein
the more deformation resistant region includes
a recess bottom wall defining the recess, and
a recess sidewall defining the recess and extending in a direction intersecting the recess bottom wall, and
in the heating of the first region and the second region, the less deformation resistant region is relatively rotated while being relatively pressed against the recess bottom wall of the more deformation resistant region.

18. The machine component producing method according to claim 16, wherein
the more deformation resistant region includes
a recess bottom wall defining the recess, and
a recess sidewall defining the recess and extending in a direction intersecting the recess bottom wall, and
in the heating of the first region and the second region, the less deformation resistant region is relatively rotated while being relatively pressed against the recess bottom wall of the more deformation resistant region.

19. The machine component producing method according to claim 17, wherein in the heating of the first region and the second region, the less deformation resistant region is deformed to contact the recess sidewall.

20. The machine component producing method according to claim 17, further comprising, in a state where the first region and the second region are joined together, machining the more deformation resistant region to remove the recess sidewall.

* * * * *